(12) United States Patent
Shinoda

(10) Patent No.: US 8,078,138 B2
(45) Date of Patent: Dec. 13, 2011

(54) IN-VEHICLE EMERGENCY CALL APPARATUS

(75) Inventor: Kouji Shinoda, Farmington Hills, MI (US)

(73) Assignee: Denso Corporation, Kariya (JP)

( * ) Notice: Subject to any disclaimer, the term of this patent is extended or adjusted under 35 U.S.C. 154(b) by 805 days.

(21) Appl. No.: 11/982,212

(22) Filed: Nov. 1, 2007

(65) Prior Publication Data

US 2008/0132200 A1 Jun. 5, 2008

(30) Foreign Application Priority Data

Nov. 2, 2006 (JP) .................................. 2006-299184

(51) Int. Cl.
*H04M 11/04* (2006.01)

(52) U.S. Cl. ............... 455/404.2; 455/456.1; 455/456.2; 455/456.3; 455/414.2; 455/404.1

(58) Field of Classification Search ............... 455/404.2, 455/456.1, 456.2, 456.3, 414.2, 404.1
See application file for complete search history.

(56) References Cited

U.S. PATENT DOCUMENTS

| | | | |
|---|---|---|---|
| 5,890,061 A * | 3/1999 | Timm et al. ................. | 455/404.2 |
| 6,404,352 B1 | 6/2002 | Ichikawa et al. | |
| 6,838,998 B1 * | 1/2005 | Brown et al. ............ | 340/825.49 |
| 2003/0016147 A1 * | 1/2003 | Evans .......................... | 340/988 |
| 2011/0051916 A1 * | 3/2011 | Elliott ....................... | 379/201.02 |

FOREIGN PATENT DOCUMENTS

| | | |
|---|---|---|
| JP | 11-283158 | 10/1999 |
| JP | 2000-097711 | 4/2000 |
| JP | A-2000-207688 | 7/2000 |
| JP | 2001-043469 | 2/2001 |
| JP | 2004-178495 | 6/2004 |

OTHER PUBLICATIONS

Computer translation for IDS document dated Nov. 1, 2007. JP 2000-09771, Publication date Jul. 4, 2000., Wada et al.*
Office Action mailed on Dec. 21, 2010 from JPO in the corresponding Japanese patent Application No. 2006-299184 with English translation.

* cited by examiner

*Primary Examiner* — Barry Taylor
(74) *Attorney, Agent, or Firm* — Harness, Dickey & Pierce, PLC

(57) ABSTRACT

A start trigger of an emergency call occurs. In this case, an in-vehicle emergency call apparatus mounted in a vehicle does not transmit all the positional data items presently stored in a memory unit to a service center. Alternatively, the in-vehicle emergency call apparatus transmits only the newest positional data item to the service center. Thus, even if a communication link with the service center has a low transmission speed, the positional data of the vehicle can be promptly notified to the service center.

7 Claims, 6 Drawing Sheets

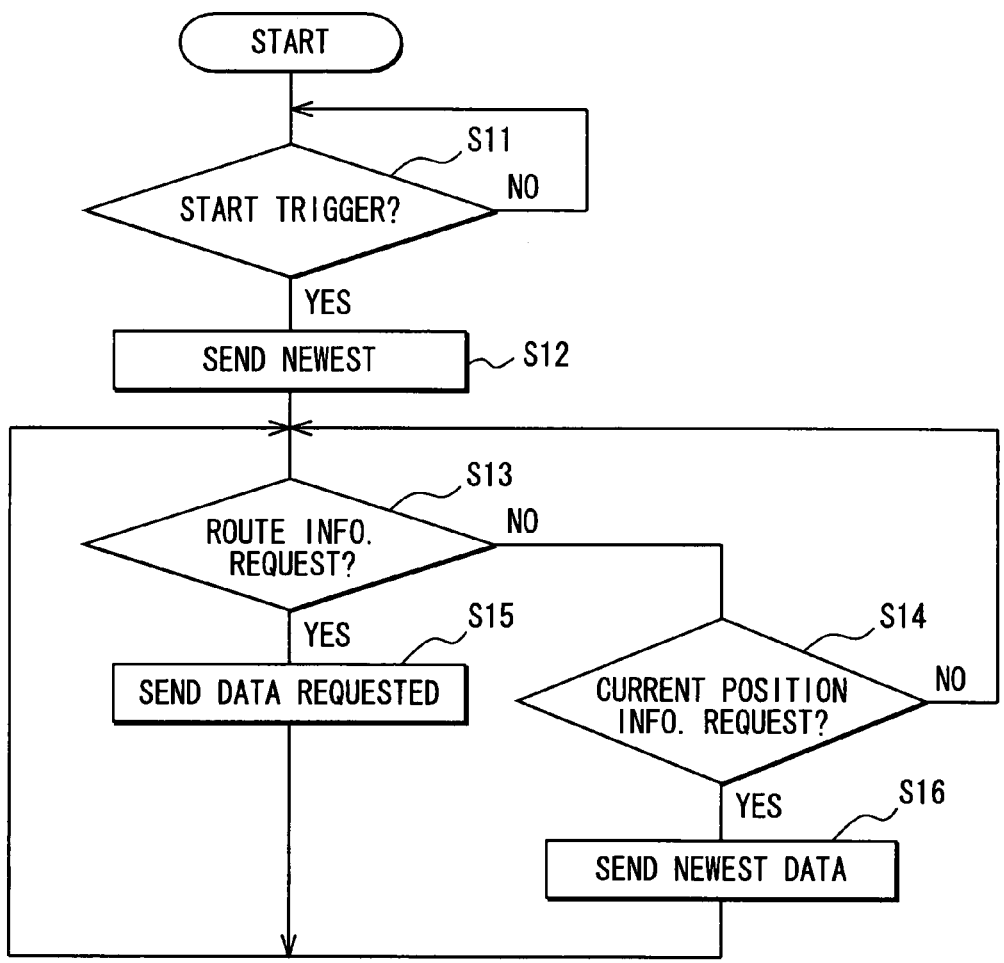

FIG. 5A

| t(n) | Pa(n) |
|---|---|
| t(n−1) | Pa(n−1) |
| t(n−2) | Pb(n−2) |
| ⋮ | ⋮ |
| t(8) | Pa(8) |
| t(5) | Pa(5) |
| t(3) | Pb(3) |
| t(2) | Pa(2) |
| t(1) | Pa(1) |
| t(0) | Pa(0) |

← DATA SENT JUST AFTER TRIGGER

← DATA SENT JUST AFTER ROUTE INFO. REQUEST

FIG. 5B

| t(n) | Pa(n) |
|---|---|
| t(n−1) | Pa(n−1) |
| t(n−2) | Pb(n−2) |
| ⋮ | ⋮ |
| t(8) | Pa(8) |
| t(5) | Pa(5) |
| t(3) | Pb(3) |
| t(2) | Pa(2) |
| t(1) | Pa(1) |
| t(0) | Pa(0) |

← DATA SENT JUST AFTER TRIGGER

← DATA SENT JUST AFTER ROUTE INFO. REQUEST

FIG. 6

| | |
|---|---|
| t(n) | Pa(n) |
| t(n−1) | Pa(n−1) |
| t(n−2) | Pb(n−2) |
| : | : |
| t(8) | Pa(8) |
| t(5) | Pa(5) |
| t(3) | Pb(3) |
| t(2) | Pa(2) |
| t(1) | Pa(1) |
| t(0) | Pa(0) |

← DATA SENT JUST AFTER TRIGGER

↓ VEHICLE MOVES (DATA UPDATED)

| | |
|---|---|
| t(n+3) | Pa(n+3) |
| t(n+2) | Pa(n+2) |
| t(n+1) | Pa(n+1) |
| t(n) | Pa(n) |
| t(n−1) | Pa(n−1) |
| t(n−2) | Pb(n−2) |
| : | : |
| t(8) | Pa(8) |
| t(5) | Pa(5) |
| t(3) | Pb(3) |

← DATA SENT JUST AFTER C. POSITION INFO. REQUEST

IN-VEHICLE EMERGENCY CALL APPARATUS

CROSS REFERENCE TO RELATED APPLICATION

This application is based on and incorporates herein by reference Japanese Patent Application No. 2006-299184 filed on Nov. 2, 2006.

FIELD OF THE INVENTION

The present invention relates to an in-vehicle emergency call apparatus, which stores positional data in a time series and transmits the stored positional data to a service center as an emergency call signal when a start trigger of the emergency call occurs.

BACKGROUND OF THE INVENTION

For example, an in-vehicle emergency call apparatus stores positional data obtained from a navigation system, and transmits the stored positional data to a service center as an emergency call when a start trigger occurs, e.g., a traffic accident occurs (refer to Patent document 1).
Patent document 1: JP-2001-043469 A In the above in-vehicle emergency call apparatus, when the start trigger of the emergency call occurs, an audio communication link is connected with the service center. After the audio communication link is connected, positional data is first transmitted to the service center via the audio communication link. Thereafter the user (driver) can execute a voice call (conversation) with an operator in the service center.

On the other hand, the in-vehicle emergency call apparatus stores positional data items up to a predetermined maximum number (for example, ten items) tracing back to the past from the newest positional data item. When storing a newest positional data item with the positional data items stored up to the predetermined maximum number, the earliest (or oldest) positional data item is eliminated and the newest positional data item is stored. When a start trigger of the emergency call occurs, all of the stored positional data items are transmitted to the service center.

Thus, in the in-vehicle emergency call apparatus which connects the audio communication link with the service center when a start trigger of an emergency call occurs, the following disadvantage may occur. If the positional data items of the predetermined maximum number are stored, it takes a time too long to complete transmitting of all the positional data items because of the low transmission speed of the audio communication link. This does not respond to the user's requirement to quickly notify the service center of the vehicle's positional data.

SUMMARY OF THE INVENTION

The present invention is made in view of the above-mentioned situation. It is an object to provide an in-vehicle emergency call apparatus capable of transmitting positional data of a vehicle and promptly notifying a service center of a vehicle position, even if a communication link with the service center has a low transmission speed.

To achieve the above object, according to an embodiment of the present invention, an in-vehicle emergency call apparatus for a vehicle is provided as follows. A positional data acquisition unit is configured to acquire positional data items in a time series. A positional data storing unit is configured to store the positional data items acquired in the time series up to a predetermined number. A control unit is configured to transmit a positional data item stored in the positional data storing unit to a service center via a transmitting unit. Here, when a start trigger signal of an emergency call occurs, the control unit transmits positional data at least including a newest positional data item from among the positional data items stored in the positional data storing unit to the service center.

As another example of the present invention, a method is provided for transmitting an emergency call from a vehicle to a service center. The method comprises: (i) acquiring positional data items for the vehicle in a time series; (ii) storing the positional data items acquired in the time series up to a predetermined number in a memory unit; and (iii) transmitting positional data at least including a newest positional data item from among the positional data items stored in the memory unit to the service center when a start trigger signal of an emergency call occurs in the vehicle.

BRIEF DESCRIPTION OF THE DRAWINGS

The above and other objects, features, and advantages of the present invention will become more apparent from the following detailed description made with reference to the accompanying drawings. In the drawings:
FIG. 4 is a flow chart;
FIGS. 5A, 5B are diagrams schematically illustrating how to transmit positional data to a service center;
and
FIG. 6 is a diagram schematically illustrating how to transmit positional data to the service center.

DETAILED DESCRIPTION OF THE PREFERRED EMBODIMENTS

Figure 1:
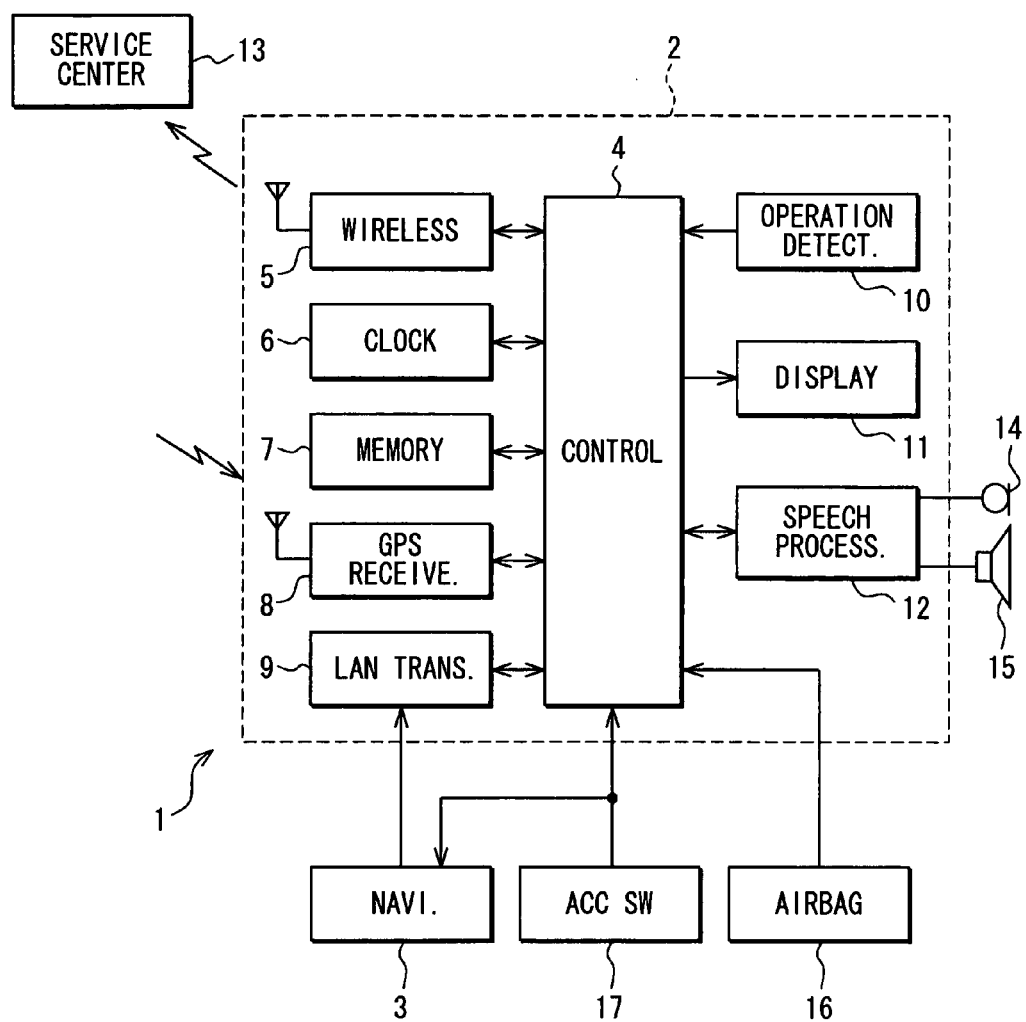
FIG. 1 is a functional block diagram showing an in-vehicle emergency call apparatus according to an embodiment of the present invention.

An embodiment according to the present invention will be explained with reference to drawings. FIG. 1 indicates a configuration of an in-vehicle emergency call system according to the embodiment using a functional block diagram. The in-vehicle emergency call system 1 mounted in a vehicle includes an in-vehicle emergency call apparatus 2 and a navigation system 3. The in-vehicle emergency call apparatus 2 includes a control unit 4, a wireless communication unit 5 as a transmitting unit, a clock unit 6, a memory unit 7 as a positional data storing unit, a GPS (Global Positioning System) positioning unit 8 as a positional data acquisition unit, a LAN (Local Area Network) transceiver unit 9 as a positional data acquisition unit, an operation detection unit 10, a display unit 11, and a speech processor 12.

The control unit 4 includes a CPU and controls overall operation of the in-vehicle emergency call apparatus 2. The wireless communication unit 5 transmits an emergency call signal to a service center 13 through a wireless communication network when an emergency call command signal is inputted from the control unit 4. Here, the emergency call signal includes the various data, such as (i) positional data for indicating a vehicle position and (ii) apparatus identification information for identifying the in-vehicle emergency call apparatus 2.

The clock unit 6 counts time when receiving a clocking command signal from the control unit 4. The GPS positioning unit 8 receives a GPS signal transmitted from GPS satellites, when receiving a positioning command signal from the control unit 4. The GPS positioning unit 8 then extracts positioning assist information (almanac data, ephemeris data, etc.) which are needed for acquiring positional data from the GPS signal, and calculates the positioning assist information to acquire positional data (latitude and longitude) periodically (e.g., every second).

The LAN transceiver unit 9 has an interface function with an in-vehicle LAN, and transmits and receives the variety of information with the navigation system 3. When the navigation system 3 is normally operating, positional data (latitude and longitude) are periodically received and acquired from the navigation system 3 (e.g., every second). In this case, when the positional data acquired from the navigation system 3 is compared with positional data obtained by the GPS positioning unit 8 (by calculating the positioning assist information), there is a difference in their natures. The former is amended by using a map matching process along with a speed signal or a detection result of a gyroscope, so the positioning accuracy of the former is higher than the latter. Moreover, when the navigation system 3 normally operates, the LAN transceiver unit 9 receives and acquires the positional data from the navigation system 3 while receiving and acquiring a travel speed, a travel distance, etc., from the navigation system 3.

The memory unit 7 stores in a time series the various information such as (i) the positional data which the LAN transceiver unit 9 receives and acquires from the navigation system 3 and (ii) the positional data which the GPS positioning unit 8 detects and acquires. In this case, the control unit 4 stores the positional data items up to a predetermined number (e.g., ten items) at the maximum tracing back to the past from the newest positional data item in the memory unit 7. If storing a newest (i.e., most recent) positional data item in the memory unit 7 when the positional data items of the predetermined number are already stored, the earliest positional data item is eliminated from among the stored positional data items of the predetermined number and the newest one is then stored.

The operation detection unit 10 outputs an operation detection signal to the control unit 4 when the user operates an emergency call button. The display unit 11 displays display information based on a display command signal inputted from the control unit 4. The speech processor 12 performs speech-processing for transmission sounds inputted via a microphone 14 or reception sounds outputted via a speaker 15. In this case, when the audio communication link is connected between the in-vehicle emergency call apparatus 2 and the service center 13, the user (driver) can make a voice call (conversation) with an operator in the service center 13 using the microphone 14 and speaker 15, thereby demanding rescue orally or reporting the degree of an accident.

An airbag system 16 detects a collision of the vehicle and outputs a collision detection signal to the control unit 4 if an impact is more than a predetermined level. In this case, the control unit 4 operates an emergency call based on a start trigger (i.e., a start trigger signal) generated when receiving a collision detection signal from the operation detection unit 10 based on the user's operating the emergency call button or when receiving a collision detection signal from the airbag system 16.

An ACC (accessory) switch 17 outputs an ACC ON signal and ACC OFF signal indicating its on-off states to the control unit 4. In this case, when the ACC ON signal is inputted from ACC switch 17, the control unit 4 causes the in-vehicle emergency call apparatus 2 to start a normal operation. The control unit 4 then causes the LAN transceiver unit 9 to receive positional data from the navigation system 3 periodically, and further outputting a positioning command signal to start the GPS positioning unit 8. The GPS positioning unit 8 is thus caused to receive GPS signals to acquire positional data periodically.

In contrast, when the ACC OFF signal is inputted from ACC switch 17, the control unit 4 causes the in-vehicle emergency call apparatus 2 to start a low power operation. The control unit 4 then causes the LAN transceiver unit 9 to stop receiving the positional data from the navigation system 3. In contrast, for example, when a start trigger (i.e., a start trigger signal) of theft pursuit occurs, a positioning command signal is outputted to the GPS positioning unit 8. Thus, to perform the theft pursuit, the positional data detected by the GPS positioning unit 8 is stored in the memory unit 7 or transmitted outside via the wireless communication unit 5.

In addition, the in-vehicle emergency call apparatus 2 and the navigation system 3 can be connected with each other via not only the in-vehicle LAN but also USB connection. Moreover, the navigation system 3 starts when the ACC ON signal is inputted from the ACC switch 17, and stops when the ACC OFF signal is inputted from the ACC switch 17.

Figure 2:
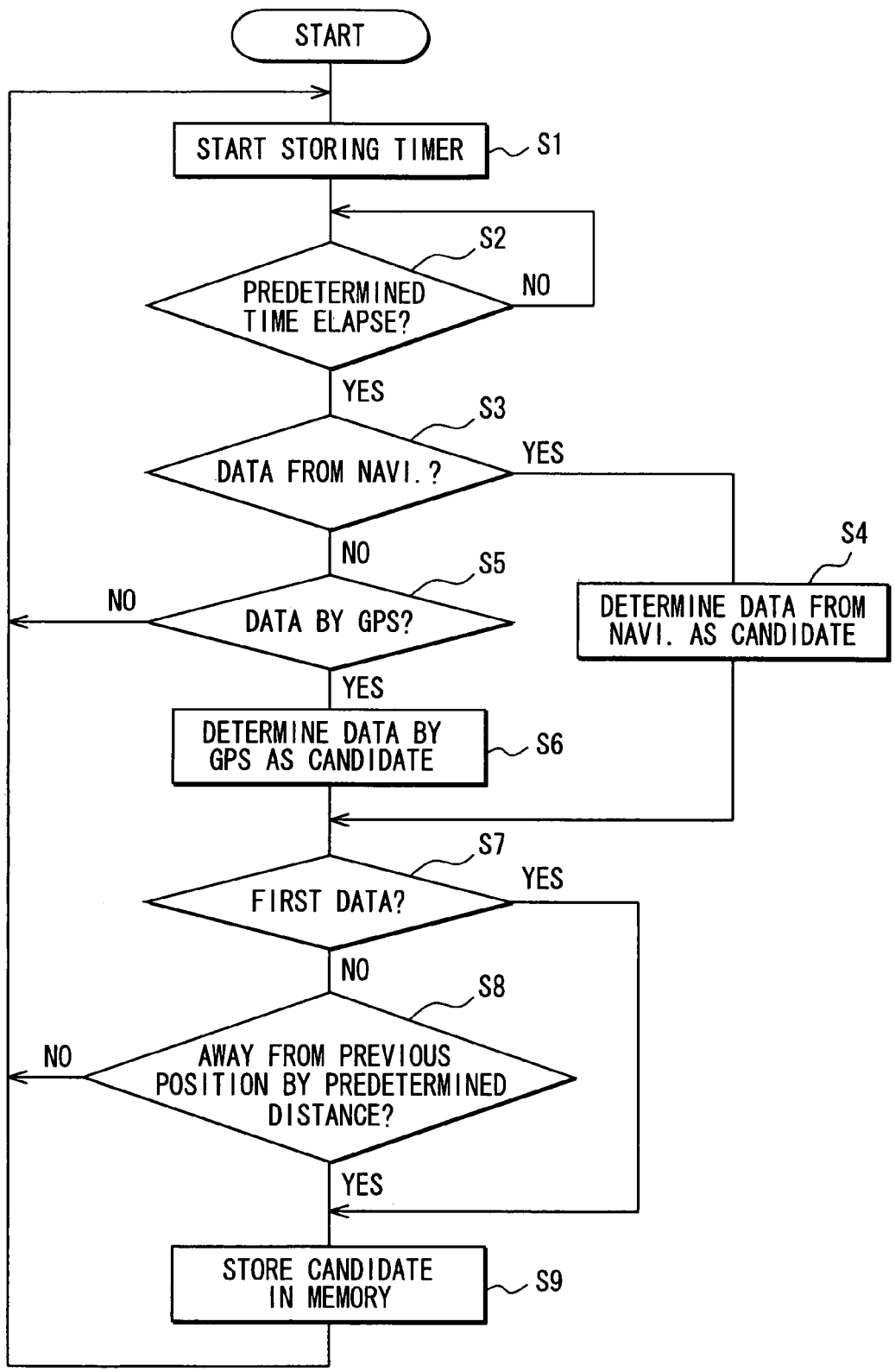
FIG. 2 is a flow chart.

Next, an operation of the above configuration will be explained with reference to FIG. 2 and subsequent drawings. The control unit 4 receives an ACC ON signal from the ACC switch 17 and causes the in-vehicle emergency call apparatus 2 to perform a normal operation. The control unit 4 then starts a positional data storing timer in the clock unit 6 (Step S1), and determines whether a predetermined time elapses in the positional data storing timer (Step S2). In this case, the predetermined time, e.g., one second, in the positional data storing timer is equivalent to an interval of reception time that the control unit 4 receives positional data from the navigation system 3 periodically and an interval of detection time that the GPS positioning unit 8 detects positional data periodically. Subsequently, when determining that the predetermined time in the positional data storing timer elapses (YES at Step S2), the control unit 4 determines whether a positional data item is received and acquired from the navigation system 3 (Step S3).

Here, when determining receiving and acquiring a positional data item from the navigation system 3 (YES at Step S3), the control unit 4 determines the positional data item received and acquired from the navigation system 3 to be a storing candidate positional data item (Step S4). In contrast, when determining not acquiring the positional data item from the navigation system 3 (NO at Step S3), the control unit 4 determines whether the GPS positioning unit 8 detects and acquires a positional data item (Step S5). When determining that the GPS positioning unit 8 detects and acquires the positional data item (YES at Step S5), the control unit 4 determines the positional data item detected and acquired by the GPS positioning unit 8 to be the storing candidate positional data item (Step S6).

Subsequently, the control unit 4 determines whether the previous positional data item is stored in the memory unit 7 (Step S7). When determining that the previous positional data item is not stored (i.e., the presently acquired positional data item is to be stored first in the memory unit 7 (YES at Step S7), the control unit 4 stores in the memory unit 7 the positional data item determined to be the storing candidate positional data item (Step S9). The process then returns to Step S1 and repeats the above steps.

In contrast, when determining that the previous positional data item is stored in the memory unit 7 (NO at Step S7), the control unit 4 compares the presently acquired positional data item with the previous positional data item (i.e., the positional data item most recently stored in the memory unit 7) to determine whether the present position is away from the previous position by a predetermined distance (e.g., 80 meters) or more (Step S8).

When determining that the present position is away from the previous position by the predetermined distance or more (YES at Step S8), the control unit 4 stores the positional data item determined to be the storing candidate positional data item as the newest positional data item in the memory unit 7 (Step S9). The process then returns to Step S1 and repeats the above steps. In contrast, when determining that the present position is not away from the previous position by the predetermined distance or more (NO at Step S8), the control unit 4 does not store in the memory unit 7 the positional data item determined to be the storing candidate positional data item as the newest positional data item. The process then returns to Step S1 and repeats the above steps.

Figure 3:
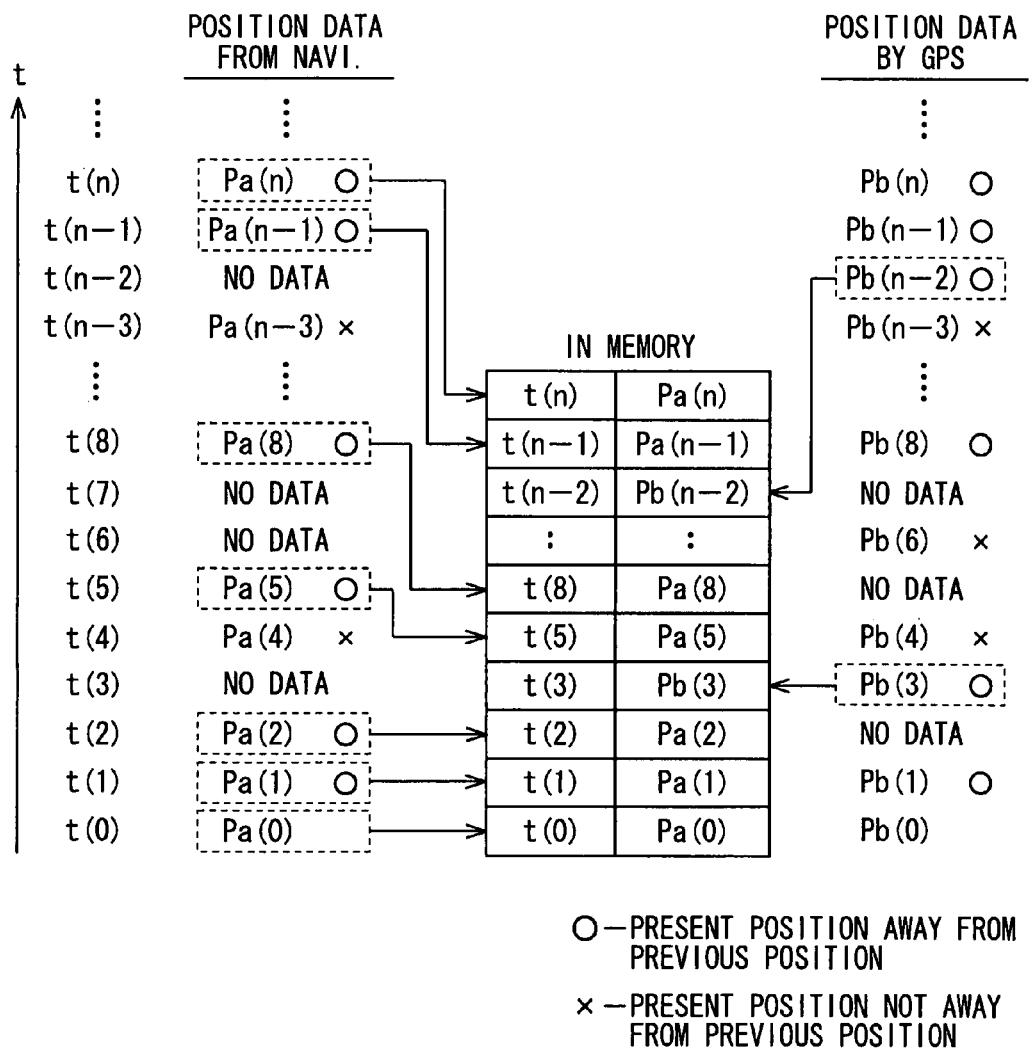
FIG. 3 is a diagram schematically illustrating how to store positional data.

By executing a series of steps or processes explained above, the control unit 4 stores either a positional data item received and acquired from the navigation system 3 or a positional data item detected and acquired by the GPS positioning unit 8 at each time, and continues storing positional data items, in a time series up to the predetermined number at the maximum in the memory unit 7, as indicated in FIG. 3. Namely, when storing a positional data item in the memory unit 7, the control unit 4 may receive and acquire a positional data item from the navigation system 3 and at the same time the GPS positioning unit 8 may detect and obtain a positional data item. In this case, if the position of the positional data item acquired from the navigation system 3 is away from the previous position by the predetermined distance or more, the control unit 4 stores the positional data item acquired from the navigation system 3 in the memory unit 7 (e.g., refer to "Pa (1)", "Pa (8)", "Pa (n−1)", and "Pa (n)").

Moreover, when storing a positional data item at the memory unit 7, the control unit 4 may receive and acquire a positional data item from the navigation system 3 but the GPS positioning unit 8 may not detect and obtain a positional data item at the same time. In this case, if the position of the positional data item acquired from the navigation system 3 is away from the previous position by the predetermined distance or more, the control unit 4 stores the positional data item acquired from the navigation system 3 in the memory unit 7 (e.g., refer to "Pa (2)" and "Pa (5)"). Moreover, when storing a positional data item at the memory unit 7, the GPS positioning unit 8 may detect and acquire a positional data item but the control unit 4 may not receive and acquire a positional data item from the navigation system 3 at the same time. In this case, if the position of the positional data item acquired by the GPS positioning system 8 is away from the previous position by the predetermined distance or more, the control unit 4 stores the positional data item acquired by the GPS positioning system 8 in the memory unit 7 (e.g., refer to "Pb (3)" and "Pb (n−2)").

While performing a process of storing the positional data item in the memory unit 7, the control unit 4 performs a process of determining whether a start trigger signal of an emergency call occurs. In this case, the control unit 4 determines either whether an operation detection signal is inputted by the user's operating the emergency call button or whether a collision detection signal is inputted from the airbag system 16. When detecting that the start trigger signal occurs (YES at Step S11), the control unit 4 transmits (i.e., sends) only the newest positional data item selected from among the positional data items presently stored in the memory unit 7 to the service center 13 through the wireless communication network via the wireless communication unit 5 as the emergency call signal (Step S12).

Here, an operator is stationed in the service center 13. The operator specifies the vehicle position based on the newest positional data item received from the in-vehicle emergency call apparatus 2. If then specifying a route, the operator operates to transmit a route request signal to request route information from the service center 13. In contrast, if then specifying a current position, the operator operates to transmit a current position request signal to request current position information from the service center 13.

The control unit 4 determines whether the wireless communication unit 5 receives the current position request signal while determining whether the wireless communication unit 5 receives the route request signal from the service center 13 (Steps S13, S14).

When the control unit 4 determines that the wireless communication unit 5 receives the route request signal transmitted from the service center 13 according to the operation of the operator (YES at Step S13), the control unit 4 transmits, from among the positional data items presently stored in the memory unit 7, only the positional data items of a given number requested by the operator to the service center 13 through the wireless communication network via the wireless communication unit 5 (Step S15).

For instance, the positional data items of the predetermined number may be stored presently and the given number requested by the service center 13 may be the number excluding the newest positional data item. In this case, as indicated in FIG. 5A, the control unit 4 transmits positional data items excluding the newest positional data item from among the positional data items presently stored in the memory unit 7. In contrast, the given number requested by the service center 13 may be equal to the predetermined number. In this case, as indicated in FIG. 5B, the control unit 4 transmits all the positional data items of the predetermined number including the newest positional data item. In addition, the given number requested by the service center 13 may be no more than the predetermined number. In this case, the control unit 4 transmits the positional data items of the requested given number while giving priority to newer ones among the stored positional data items.

When the control unit 4 determines that the wireless communication unit 5 receives the current position request signal transmitted from the service center 13 according to the operation of the operator (YES at Step S14), the control unit 4 transmits, from among positional data items presently stored in the memory unit 7, only the presently newest positional data item to the service center 13 through the wireless communication network via the wireless communication unit 5 (Step S16).

Here, the vehicle may not move from when the start trigger signal of the emergency call occurs, to thereby not update the positional data items. In this case, the newest positional data item transmitted when the start trigger signal occurred is transmitted again. In contrast, the vehicle may move from when the start trigger signal occurs, to thereby update the positional data items. In this case, the control unit 4 transmits a newest positional data item, which is included in the updated positional data items and different from the newest positional data item transmitted when the start trigger signal occurred, as shown in FIG. 6.

As explained above, according to the embodiment, when a start trigger signal of an emergency call occurs, all the whole positional data items presently stored in the memory unit 7 are not transmitted to the service center 13. Instead, only the newest positional data item is transmitted to the service center 13. Thus, even if the start trigger signal of the emergency call occurs under the condition that the communication link with the service center 13 has a low transmission speed, the time to complete transmitting of the positional data to the service center 13 can be shortened. The vehicle position can be thereby promptly notified to the service center 13.

The present invention is not limited only to the above-mentioned embodiment, and can be modified or extended as follows. The in-vehicle emergency call apparatus can be included as a part of the navigation system. The start trigger signal can be generated optionally based on another signal other than the collision detection signal from the airbag system or the operation detection signal from the operation detection unit according to the user's operating the emergency call button.

To store positional data in a time series, two separate memory areas may be provided individually for the positional data from the navigation system and the positional data by the GPS positioning unit. When the start trigger signal of the emergency call occurs, the control unit can transmit positional data items stored in either of two memory areas to the service center. In this case, the control unit can transmit the positional data items stored in whichever memory area storing the data items more than the other memory area. Otherwise, the control unit can transmit the positional data items stored in whichever memory area has higher continuity in the time series than the other memory area.

When the start trigger signal of the emergency call occurs, not only the newest positional data item but also several positional data items at least including the newest positional data item can be transmitted to the service center from among the positional data items stored in the memory unit. The emergency call system is not only limited to the configuration, in which both the navigation system and the GPS positioning unit are included and positional data items acquired from either of them is transmitted to the service center. If the GPS positioning unit is not included, only the positional data received and acquired from the navigation system can be transmitted to the service center. If the navigation system is not cooperative with the emergency call system, only the positional data detected and acquired by the GPS positioning unit can be transmitted to the service center.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect, an in-vehicle emergency call apparatus for a vehicle is provided as follows. A positional data acquisition unit is configured to acquire positional data items in a time series. A positional data storing unit is configured to store the positional data items acquired in the time series up to a predetermined number. A control unit is configured to transmit a positional data item stored in the positional data storing unit to a service center via a transmitting unit. Here, when a start trigger signal of an emergency call occurs, the control unit transmits positional data at least including a newest positional data item from among the positional data items stored in the positional data storing unit to the service center.

At a time when a start trigger signal of an emergency call occurs, a communication link having a low transmission speed is connected between the in-vehicle emergency call apparatus and the service center. Here, all the positional data items in the vehicle are not transmitted to the service center at the time. Otherwise, part of the stored positional data items at least including the newest positional data item at the time is transmitted to the service center. This decreases the time to complete transmitting of the positional data to the service center and allows the vehicle position to be promptly notified to the service center.

In the above in-vehicle emergency call apparatus, the control unit transmits the positional data at least including the newest positional data item to the service center based on the start trigger signal of the emergency call occurring, and then, if transmission of route information is requested from the service center, the control unit may transmit positional data items, which are stored in the positional data storing unit and were not transmitted to the service center.

Thereby, when transmission of route information is demanded from the service center, the positional data necessary for specifying the route of the vehicle can be transmitted to the service center.

In the above in-vehicle emergency call apparatus, the control unit transmits the positional data at least including the newest positional data item to the service center based on the start trigger signal of the emergency call occurring, and then, at a time when transmission of route information is requested from the service center, the control unit may transmit, to the service center, positional data including (i) a newest positional data item stored at the time in the positional data storing unit and (ii) a positional data item, which is stored at the time in the positional data storing unit and was not transmitted to the service center.

Thereby, when transmission of route information is demanded from the service center, the positional data necessary for specifying the current position and route of the vehicle can be transmitted to the service center.

In the above in-vehicle emergency call apparatus, the control unit transmits the positional data at least including the newest positional data item to the service center based on the start trigger signal of the emergency call occurring, and then, at a time when transmission of current position information is requested from the service center, the control unit may transmit positional data at least including a newest positional data item stored at the time in the positional data storing unit to the service center.

Thereby, when transmission of current position information is demanded from the service center, the positional data necessary for specifying the current position of the vehicle can be transmitted to the service center.

Even if the vehicle moves from a time when the start trigger signal occurs and the positional data are thereafter updated, the current position can be thereby specified in the service center.

It will be obvious to those skilled in the art that various changes may be made in the above-described embodiments of the present invention. However, the scope of the present invention should be determined by the following claims.

What is claimed is:

1. An in-vehicle emergency call apparatus for a vehicle, the apparatus comprising:
a positional data acquisition unit configured to acquire positional data items in a time series;

a positional data storing unit configured to store the positional data items acquired in the time series up to a predetermined number; and a control unit configured to transmit to a service center a positional data item stored in the positional data storing unit, wherein:

(i) at a trigger time when a start trigger signal of an emergency call occurs, the control unit transmits to the service center only a first newest positional data item which is newest among positional data items stored in the positional data storing unit at the trigger time; and (ii) at a route requested time when receiving a route request signal requesting a transmission of route information from the service center after the trigger time, the control unit transmits to the service center additional positional data items which are stored in the positional data storing unit at the route requested time and were not transmitted to the service center at the trigger time.

2. The in-vehicle emergency call apparatus according to claim 1, wherein:

a second newest positional data item is transmitted at a position requested time which is different from the first newest positional data item transmitted at the trigger time because of a movement of the vehicle that arises after the trigger time up to the position requested time.

3. The in-vehicle emergency call apparatus according to claim 1, wherein:

the control unit determines whether a distance is equal to or greater than a predetermined distance, the distance being between (i) a positional data item acquired at a first time by the positional data acquisition unit and stored as a newest positional data item at the first time in the positional data storing unit, and (ii) a positional data item acquired by the positional data acquisition unit at a second time, which is after the first time in the time series; and when determining that the distance between (i) the positional data item acquired at the first time and (ii) the positional data item acquired at the second time is equal to or greater than the predetermined distance, the control unit causes the positional data storing unit to store, as a newest positional data item at the second time, the positional data item acquired at the second time by the positional data acquisition unit.

4. The in-vehicle emergency call apparatus according to claim 1, wherein at the route requested time after the trigger time, the control unit transmits to the service center a second newest positional data item in addition to the additional positional data items, the second newest positional data item being newest among positional data items stored in the positional data storing unit at the route requested time.

5. The in-vehicle emergency call apparatus according to claim 1, wherein when receiving the route request signal to request the transmission of route information from the service center after the trigger time, a requested number of data items requested to be transmitted is also received, the control unit compares the predetermined number with the requested number and transmits to the service center based on a result of the comparing, the additional positional data items up to a maximum of the requested number while giving a priority to newer ones among the positional data items stored in the positional data storing unit at the route requested time and were not transmitted to the service center at the trigger time.

6. The in-vehicle emergency call apparatus according to claim 1, wherein at a position requested time when the service center requests a transmission of current position information after the trigger time, the control unit transmits to the service center only a second newest positional data item which is newest among positional data items stored in the positional data storing unit at the position requested time.

7. A method for transmitting an emergency call from a vehicle to a service center, the method comprising:

acquiring positional data items in a time series;

storing in a positional data storing unit the positional data items acquired in the time series up to a predetermined number; and transmitting at a trigger time when a start trigger signal of an emergency call occurs to the service center, only a first newest positional data item which is newest among positional data items stored in the positional data storing unit at the trigger time;

receiving, after the trigger time, a route request signal to request a transmission of route information from the service center; and transmitting, upon receiving the route request signal, to the service center additional positional data items which are stored in the positional data storing unit at the route requested time and were not transmitted to the service center at the trigger time.

* * * * *